United States Patent
Peasley

(10) Patent No.: US 7,165,660 B2
(45) Date of Patent: Jan. 23, 2007

(54) PARKING BRAKE ASSEMBLIES WITH AUTOMATIC CABLE LATCHING

(75) Inventor: David Peasley, Coventry (GB)

(73) Assignee: Automotive Products (SV) S.R.L., Savona (IT)

( * ) Notice: Subject to any disclaimer, the term of this patent is extended or adjusted under 35 U.S.C. 154(b) by 0 days.

(21) Appl. No.: 10/517,884

(22) PCT Filed: Jun. 11, 2003

(86) PCT No.: PCT/GB03/02482

§ 371 (c)(1),
(2), (4) Date: Dec. 13, 2004

(87) PCT Pub. No.: WO03/106856

PCT Pub. Date: Dec. 24, 2003

(65) Prior Publication Data

US 2005/0241895 A1    Nov. 3, 2005

(30) Foreign Application Priority Data

Jun. 15, 2002 (GB) ................................. 0213859.2

(51) Int. Cl.
*F16D 51/00* (2006.01)
(52) U.S. Cl. .................... 188/79.55; 188/2 D; 188/72.9
(58) Field of Classification Search ................ 188/2 D, 188/72.9, 73.34, 79.65
See application file for complete search history.

(56) References Cited

U.S. PATENT DOCUMENTS 4,955,458 A * 9/1990 Shellhause ................. 188/2 D
5,180,037 A * 1/1993 Evans ....................... 188/70 R
5,538,116 A * 7/1996 Parker et al. ............... 188/331
6,802,397 B1* 10/2004 Matteis et al. .............. 188/2 D
2002/0179378 A1* 12/2002 Jones ......................... 188/2 D

FOREIGN PATENT DOCUMENTS

WO     WO98/40640    * 9/1998

* cited by examiner

Primary Examiner—Devon Kramer
(74) Attorney, Agent, or Firm—Paul E Milliken; Ray L Weber

(57) ABSTRACT

A parking brake assembly which includes a lever (15) for operation of a brake shoe (11, 12) to provide a parking function, the lever carrying an automatic latching device for automatically latching to the lever an end fitting (20) on an operating cable (19) and a guide spring (25) extending from an associated brake backplate (13) into contact with the lever. The automatic latching device is in the form of a latching member (22) mounted on the lever which is deflected aside by the end fitting as the cable is fed in a first direction towards the lever within the guide spring and which latches behind an abutment (20a) on the end fitting to latch the cable to the lever so that subsequent movement of the cable in a second direction opposite to the first direction moves the lever to operate the parking function. The end (25a) of the guide spring (25) which contacts the lever (15) is shaped (25c) to also act on the latching member (22) to bias the latching member towards the position in which it latches behind the abutment (20a) on the end fitting (20).

8 Claims, 6 Drawing Sheets

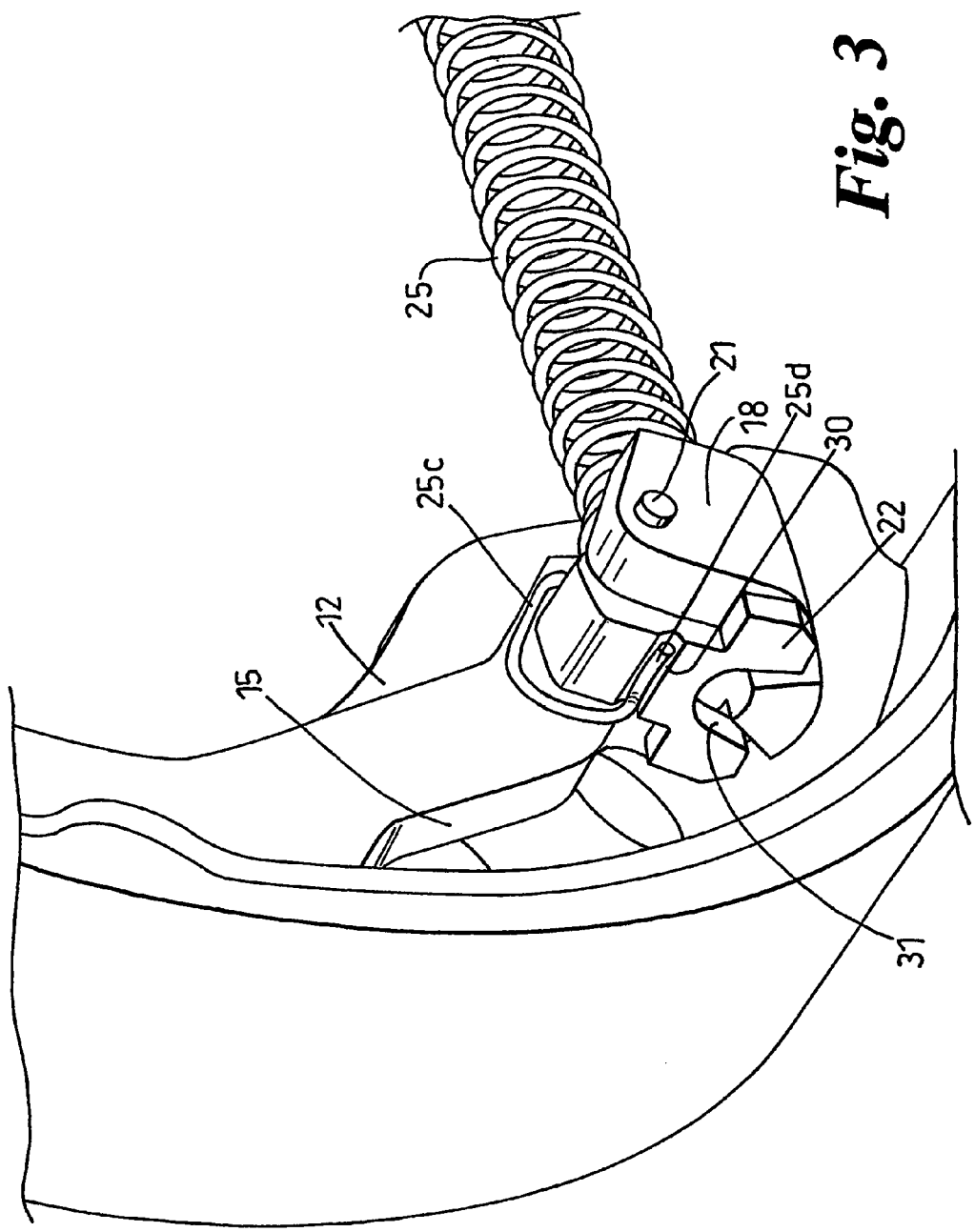

PARKING BRAKE ASSEMBLIES WITH AUTOMATIC CABLE LATCHING

This invention relates to parking brake assemblies, hereinafter referred to a of the kind described, which include a lever for operation of a brake shoe to provide a parking function, the lever carrying an automatic latching device for automatically latching to the lever an end fitting on an operating cable and a guide spring extending from an associated brake backplate into contact with the lever, the automatic latching device comprising a latching member mounted on the lever which is deflected aside by the end fitting as the cable is fed in a first direction towards the lever within the guide spring and which latches behind an abutment on the end fitting to latch the cable to the lever so that subsequent movement of the cable in a second direction opposite to the first direction moves the lever to operate the parking function.

Such parking brake assemblies may form part of a drum brake (either with the conventional two shoes of a single generally U-shaped shoe as disclosed, for example, in EP 0392829A1) which provides a parking brake function only or also provides a service brake function or may form part of a drum-in-disc brake in which a radially inner parking brake drum is surrounded by a brake disc on which a disc brake caliper acts to provide the service brake function.

An example of a parking brake assembly of the kind described is disclosed in PCT patent application No. PCT/IB98/00306.

It is an object of the present invention to provide an improved form of parking brake assembly of the kind described.

Thus according to the present invention there is provided a parking brake assembly of the land described in which the end of the guide spring which contacts the lever is shaped to also act on the latching member to bias the member towards the position in which it latches behind the abutment on the end fitting.

The latching member may comprise a flap pivotally mounted on the lever with the end of the spring which contacts the lever secured to the lever on one side of the flap and formed into a loop which extends over the flap pivot and acts on the other side of the flap remote from the remainder of the guide spring to bias flap to the latching position.

Preferably also the flap has a groove therein extending generally parallel to the pivot axis of the flap into which the end of the spring loop extends.

The invention also provides a drum brake which includes a parking brake assembly as described above.

The present invention will now be described, by way of example, with reference to the accompanying drawings in which:

FIGS. 3 and 4 show perspective view on a larger scale of the latching flap and the flap bias extension of the guide spring;

Figure 1:
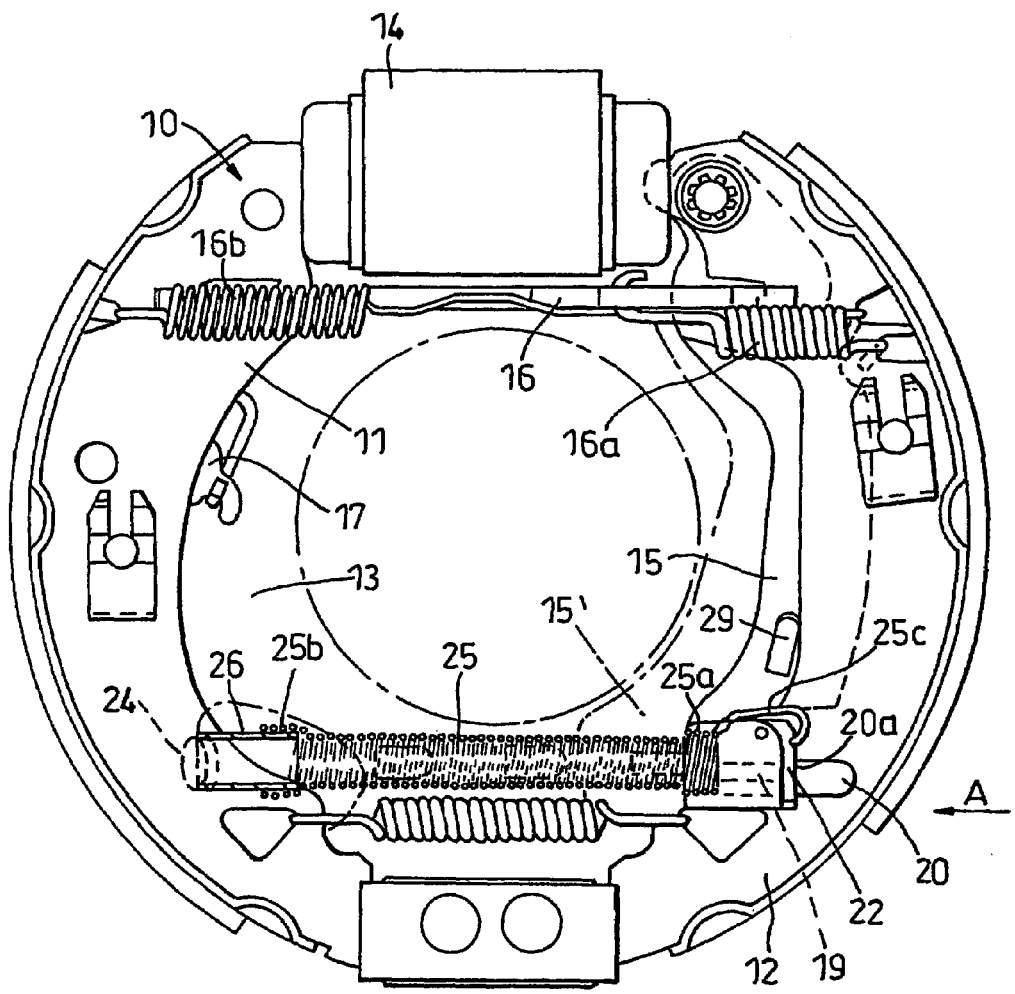
FIG. 1 is a side view of a drum brake which includes a parking brake assembly in accordance with the present invention.
Figure 7:
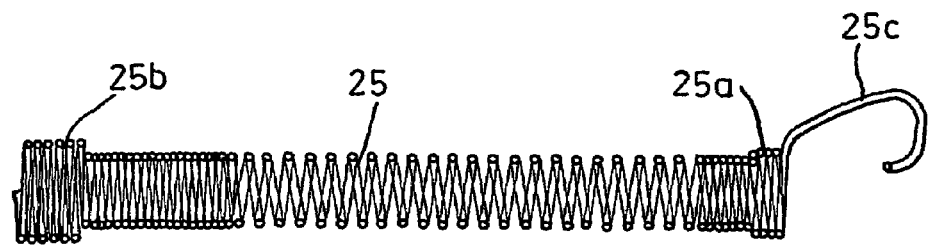
FIG. 7 shows details of the guide spring with its flap biasing extension.
Figure 2:
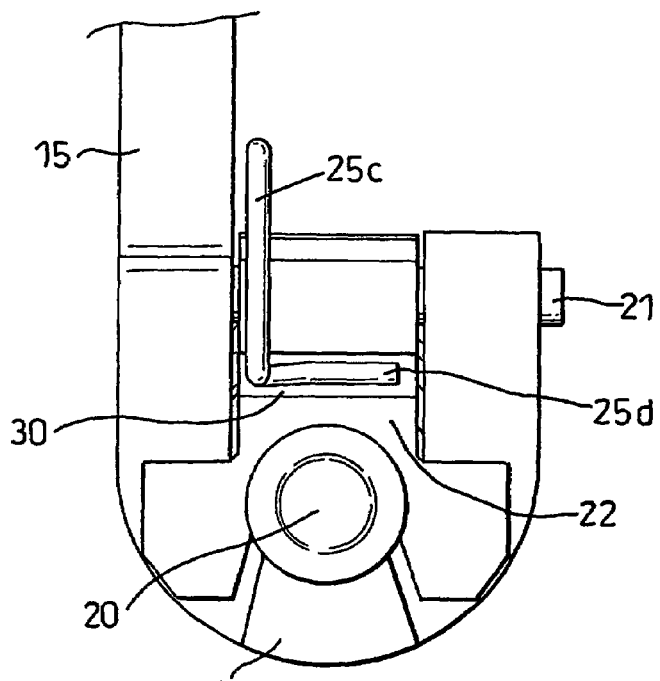
FIG. 2 is a view in the direction of arrow A of FIG. 1 on a larger scale of details of the latching flap of the assembly.

Referring to FIG. 1 this shows a drum brake in which two brake shoes 11 and 12 are mounted on a backplate 13 for operation by an hydraulic cylinder 14 to provide a service brake function in the known manner. A parking brake function is provided in which pivoting of a parking lever 15 from the full line position shown in FIG. 1 to the dotted position 15' applies both shoes to the brake drum via a strut 16. Strut 16 which is held against shoe 12 at all times by spring 16a which extends between the brake shoes and, in addition to operating the parking brake, also limits the retraction of the shoes under the action of pull-off spring 16b. The effective length of strut is adjusted by the handbrake adjusting mechanism part of which s visible at 17 and which is more fully described in the Applicant's UK patent number 2272261.

The lower end of parking brake lever 15 is of U-shaped cross section to form a channel 18 (see FIGS. 2 to 5) for the reception of the end of a handbrake operating cable 19 which has an end fitting 20.

Pivotally mounted on the lever 15 by a pin 21 is a latching member in the form of a flap 22.

Backplate 13 is provided with an aperture 24 through which the actuating cable 19 is fed and a guide means in the form of a compression-type guide spring 25 extends between the aperture 24 and the end of the channel 18 in lever 15. The larger diameter end portion 25a of spring 25 is received as a direct friction grip in the U-shaped channel 18 whilst the other larger diameter end portion 25b grips the outside of a short rigid tubular guide 26 which is supported in aperture 24. Compression spring 25 also loads lever 15 to tend to return the lever to the non-operative full line position shown in FIG. 1 with tang 29 abutting the edge of shoe 12 when the handbrake function is released.

Also, in accordance with the present invention, end portion 25a of the guide spring is provided with a loop portion 25c which extends up over the pivot 21 of flap 22 and has an end portion 25d which engages a groove 30 in flap 22 to bias flap 22 to the so-called latching position shown in FIGS. 1 to 4. Spring loop 25 also helps to hold the end portion 25a of spring 25 in channel 18.

Flap 22 also includes a tapering slot 31 which engages around a projection 18a formed on the lower portion of channel 18. Thus when end fitting 20 is in it latched position it occupies a position in which it is supported both by flap 22 and projection 18a.

Figure 10:
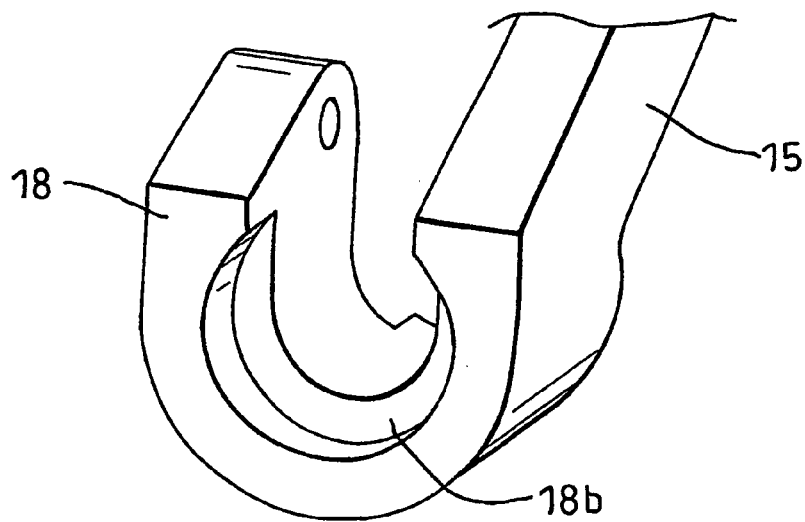
FIG. 10 is a perspective view of an alternative arrangement of the lower end of the handbrake lever from that shown in FIGS. 5 and 6.

In an alternative arrangement shown in FIG. 10 the end portion 25a of spring 25 is received in a recess 18b formed in channel 18. Spring loop portion 25c also holds the spring in recess 18b as well as biasing flap 22 to the latching position.

Figure 8:
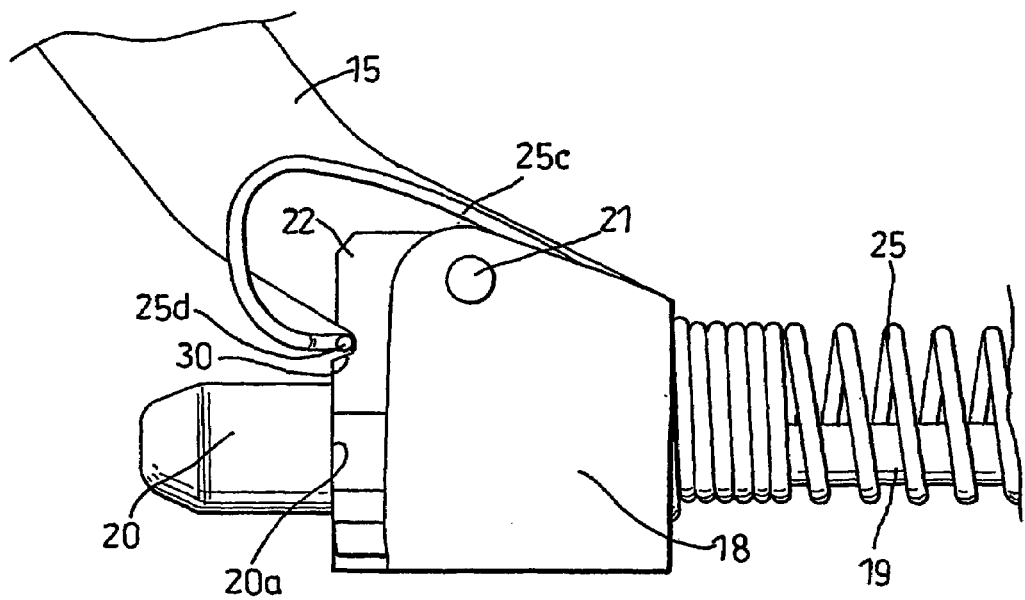
FIG. 8 shows a view in the direction of arrow B of FIG. 2.
Figure 4:
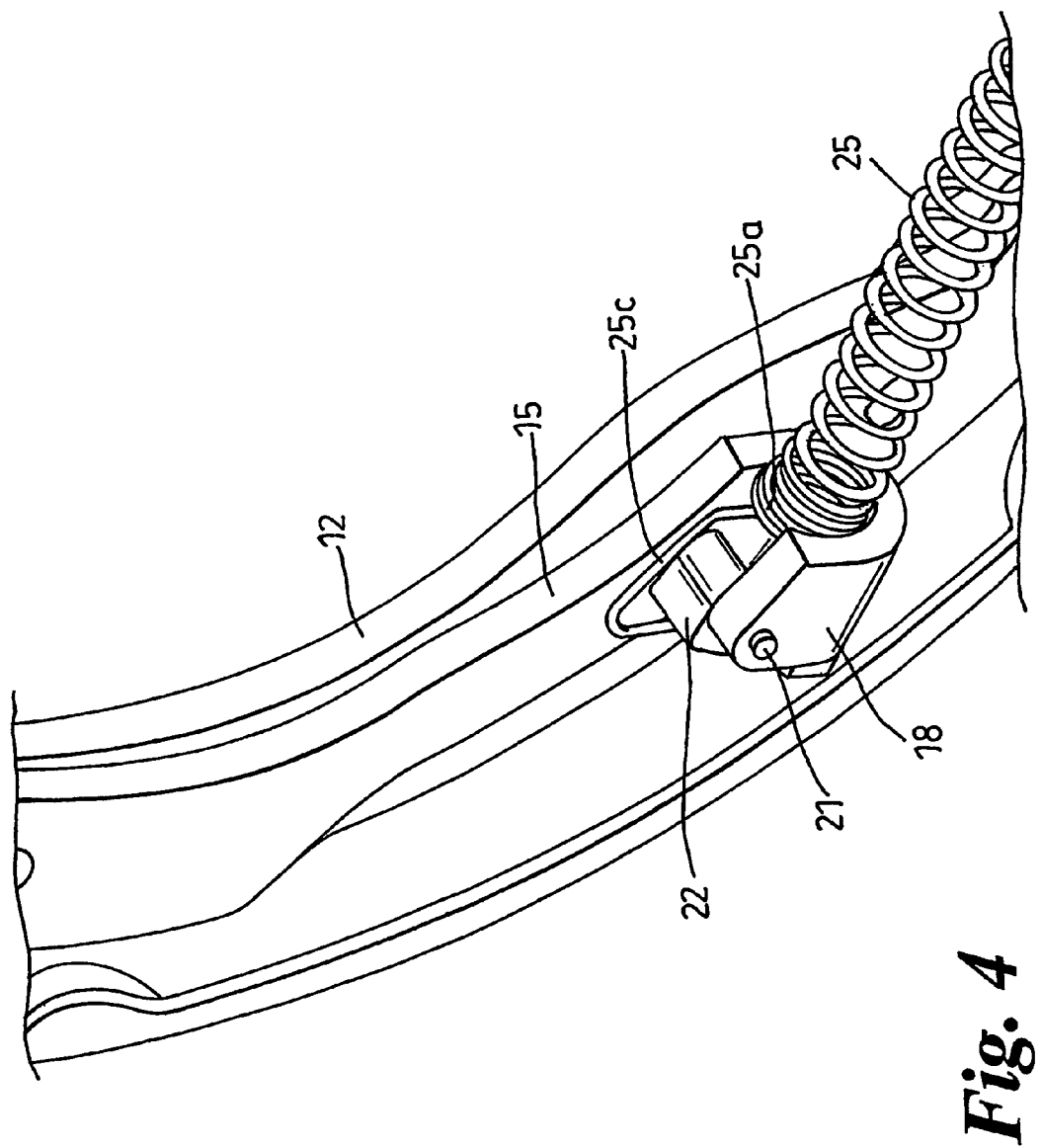
Figure 5:
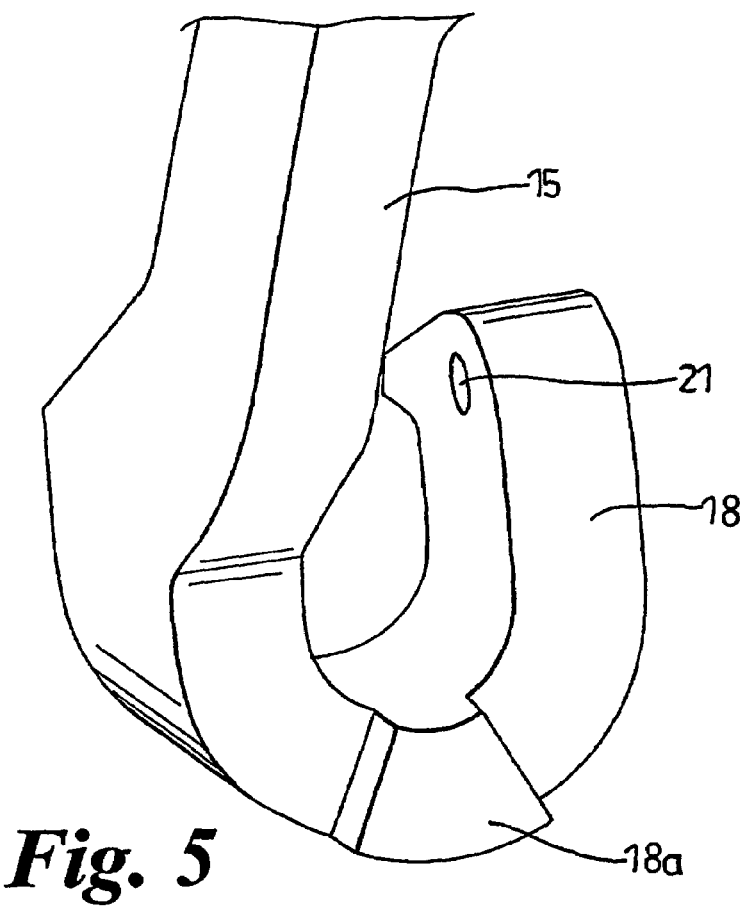
FIGS. 5 and 6 show details of the lower end of the handbrake lever and the latching flap.
Figure 6:
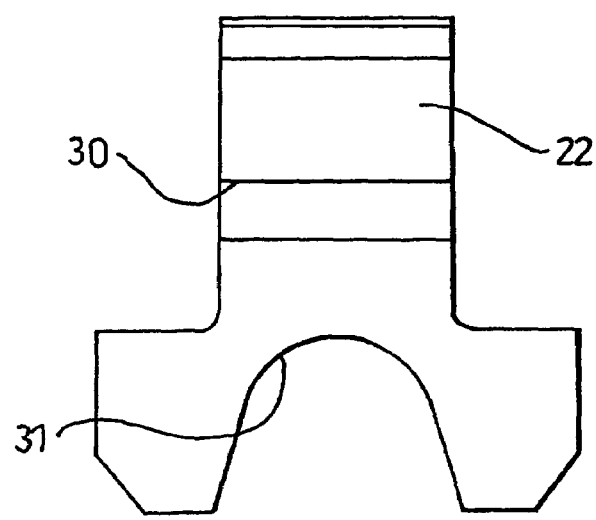
Figure 9:
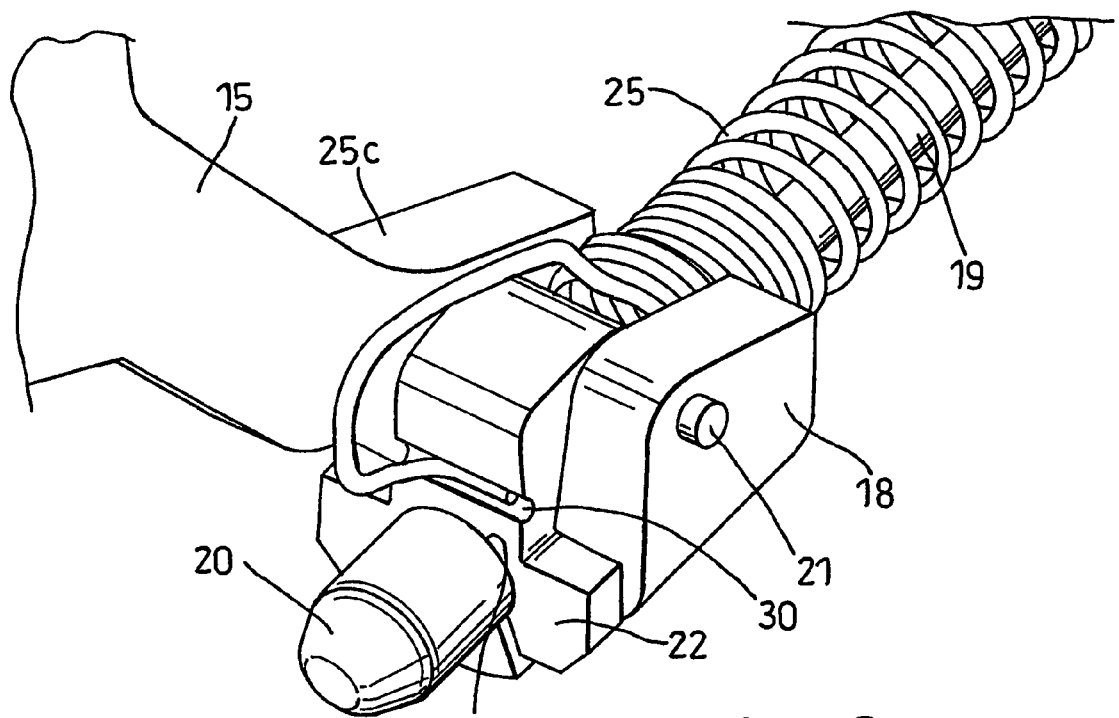
FIG. 9 shows the cable latched in position by the flap.

The attachment of the cable 19 to lever 15 is achieved as follows. The cable 19 with its end fitting 20 is fed through aperture 24 in backplate 13 and down the centre of guide spring 25 and into the end of channel 18 in lever 15. The end fitting then contacts the latching flap 22 and displaces the flap anti-clockwise about its pivot 21 as shown in FIG. 1. After the end fitting 20 has fully passed through the wider bottom portion of slot 31 in flap 22, flap 22 snaps back behind shoulder 20a on end fitting 20 to latch the cable between the lower edge of flap 22 and the edge of the channel 18 as shown in FIGS. 8 and 9.

The present invention thus provides an improved form of parking brake assembly of the kind described in which the latching member is biased to its latched position by a bias means which is formed integrally with the guide spring. Such an arrangement reduces the number of separate parts in the parking brake assembly and reduces the likelihood of the latching member bias becoming disengaged during use of the parking brake assembly.

What is claimed is:

1. A parking brake assembly which includes a lever for operation of a brake shoe to provide a parking function, the lever carrying an automatic latching device for automatically latching to the lever an end fitting on an operating cable and a guide spring extending from an associated brake backplate into contact with the lever, the automatic latching device comprising a latching member mounted on the lever which is deflected aside by the end fitting as the cable is fed in a first direction towards the lever within the guide spring and which latches behind an abutment on the end fitting to latch the cable to the lever so that subsequent movement of the cable in a second direction opposite to the first direction moves the lever to operate the parking function, the end of the guide spring which contacts the lever being extended to hook onto a locating formation on the latching member to bias the latching member towards the position in which it latches behind the abutment on the end fitting and retains the spring in position on the lever.

2. A parking brake assembly according to claim 1 in which the latching member comprises a flap pivotally mounted on the lever with the end of the guide spring which contacts the lever on one side of the flap being extended into a loop which extends over the flap pivot and acts on the locating formation on the other side of the flap remote from the remainder of the guide spring to bias the flap to the latching position.

3. A parking brake assembly according to claim 2 in which the flap has a slot in a lower edge thereof, the end fitting passing from one side of the flap to the other as the flap is deflected by passing at least partially through the lower end of the slot.

4. A parking brake assembly according to claim 3 in which the lever has an end portion in the form of a U-shaped channel, the flap latching the cable between an edge of the flap and a base portion of the U-shaped channel.

5. A parking brake assembly according to claim 4 in which a projection on the base portion of the U-shaped channel projects into the lower end of the slot in the flap so that the end fitting is supported in the latched position on the projection and the portions of the flap surrounding the slot.

6. A drum brake which includes a parking brake assembly according to claim 1.

7. A drum in disc brake which includes a parking brake assembly according to claim 1.

8. A parking brake assembly which includes a lever for operation of a brake shoe to provide a parking function, the lever carrying an automatic latching device for automatically latching to the lever an end fitting on an operating cable and a guide spring extending from an associated brake backplate into contact with the lever, the automatic latching device comprising a flap pivotally mounted on the lever which is deflected aside by the end fitting as the cable is fed in a first direction towards the lever within the guide spring and which latches behind an abutment on the end filing to latch the cable to the lever so that subsequent movement of the cable in a second direction opposite to the first direction moves the lever to operate the parking function, the end of the guide spring which contacts the lever on one side of the flap being extended into a loop which extends over the flap pivot and engages a groove formed in the other side of the flap remote from the remainder of the guide spring to bias flap towards the position in which it latches behind the abutment on the end fitting and to retains the spring in position on the lever.

* * * * *